(12) United States Patent
Park et al.

(10) Patent No.: US 12,489,171 B2
(45) Date of Patent: Dec. 2, 2025

(54) BATTERY MODULE, BATTERY PACK COMPRISING SAME, AND AUTOMOBILE

(71) Applicant: LG ENERGY SOLUTION, LTD., Seoul (KR)

(72) Inventors: Ji-Soo Park, Daejeon (KR); Young-Su Son, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 733 days.

(21) Appl. No.: 17/787,877

(22) PCT Filed: Aug. 4, 2021

(86) PCT No.: PCT/KR2021/010296
§ 371 (c)(1),
(2) Date: Jun. 21, 2022

(87) PCT Pub. No.: WO2022/031056
PCT Pub. Date: Feb. 10, 2022

(65) Prior Publication Data
US 2023/0021740 A1    Jan. 26, 2023

(30) Foreign Application Priority Data

Aug. 4, 2020    (KR) .................. 10-2020-0097562

(51) Int. Cl.
*H01M 50/342*    (2021.01)
*H01M 50/213*    (2021.01)
*H01M 50/308*    (2021.01)

(52) U.S. Cl.
CPC ..... *H01M 50/3425* (2021.01); *H01M 50/213* (2021.01); *H01M 50/308* (2021.01); *H01M 2200/20* (2013.01); *H01M 2220/20* (2013.01)

(58) Field of Classification Search
CPC ........... H01M 50/3425; H01M 50/308; H01M 50/213
See application file for complete search history.

(56) References Cited

U.S. PATENT DOCUMENTS 8,475,952 B2    7/2013    Yasui et al.
10,158,102 B2    12/2018    Wu et al.
(Continued)

FOREIGN PATENT DOCUMENTS

CN    103081164 A    5/2013
CN    107994181 A    5/2018
(Continued)

OTHER PUBLICATIONS

Office Action issued in corresponding Taiwanese Patent Application No. 110118258, dated Nov. 4, 2024. (Note: CN 111433939 A and CN 108075086 A were previously cited).
(Continued)

*Primary Examiner* — Sean P Cullen
*Assistant Examiner* — Jonathan William Estes
(74) *Attorney, Agent, or Firm* — Morgan, Lewis & Bockius LLP

(57) ABSTRACT

A battery module includes a plurality of battery cells having electrode terminals respectively at one end and the other end thereof and having a vent unit opened to discharge gas to the outside when an internal pressure increases over a predetermined level; a cell frame having an accommodation space for accommodating the plurality of battery cells and have a plurality of exposure holes opened so that the gas discharged from the battery cell moves to the outside; a screen member fixed to the cell frame to seal the exposure hole and configured to open a region thereof corresponding to the exposure hole by a gas pressure when gas is discharged from the vent unit of the battery cell; and a protection plate (Continued)

configured to fix the screen member to the cell frame and have a plurality of communication holes located corresponding to the exposure holes.

12 Claims, 8 Drawing Sheets

(56) References Cited

U.S. PATENT DOCUMENTS

| | | | |
|---|---|---|---|
| 2006/0068278 A1 | 3/2006 | Bloom et al. | |
| 2013/0095356 A1* | 4/2013 | Shimizu | H01M 50/519 |
| | | | 429/88 |
| 2013/0252037 A1* | 9/2013 | Chiba | F16K 17/16 |
| | | | 429/53 |
| 2015/0064514 A1* | 3/2015 | Wu | H01M 50/293 |
| | | | 429/120 |
| 2015/0086817 A1 | 3/2015 | Chung et al. | |
| 2016/0336556 A1 | 11/2016 | Okutani et al. | |
| 2018/0138478 A1 | 5/2018 | Chan | |
| 2019/0214694 A1 | 7/2019 | Yang et al. | |
| 2019/0350628 A1 | 11/2019 | Biedermann | |
| 2020/0006723 A1* | 1/2020 | Park | H01M 50/20 |
| 2020/0212379 A1* | 7/2020 | Shi | H01M 10/0472 |
| 2020/0227709 A1* | 7/2020 | Dittel | H01M 10/052 |
| 2020/0303701 A1 | 9/2020 | Kim et al. | |
| 2021/0194100 A1 | 6/2021 | Keum | |

FOREIGN PATENT DOCUMENTS

| | | | | |
|---|---|---|---|---|
| CN | 108075086 A | 5/2018 | | |
| CN | 208507892 U | 2/2019 | | |
| CN | 110495940 A | 11/2019 | | |
| CN | 111433939 A | 7/2020 | | |
| JP | H6-111798 A | 4/1994 | | |
| JP | 2006-515104 A | 5/2006 | | |
| JP | 2008-270032 A | 11/2008 | | |
| JP | 5803553 B2 | 11/2015 | | |
| JP | 2019-091628 A | 6/2019 | | |
| JP | 6695800 B2 | 5/2020 | | |
| KR | 10-2013-0043154 A | 4/2013 | | |
| KR | 10-1370238 B1 | 3/2014 | | |
| KR | 10-1757527 B1 | 7/2017 | | |
| KR | 10-2019-0023917 A | 3/2019 | | |
| KR | 10-2019-0042341 A | 4/2019 | | |
| KR | 10-2019-0083533 A | 7/2019 | | |
| TW | 201145643 A1 | 12/2011 | | |
| WO | 2012017586 A1 | 9/2012 | | |
| WO | 2015118597 A1 | 8/2015 | | |
| WO | 2016/014831 A1 | 1/2016 | | |
| WO | WO-2018160012 A2 * | 9/2018 | .......... | H01M 2/1016 |
| WO | WO-2019010442 A1 * | 1/2019 | ............ | H01M 10/04 |

OTHER PUBLICATIONS

Second Office action issued in Chinese Patent Application 202180007967.0, dated May 28, 2024.
International Search Report (with partial translation) and Written Opinion dated Nov. 19, 2021, for corresponding International Patent Application No. PCT/KR2021/010296.
Japanese Office Action issued in corresponding JP Application No. 2022-534443, dated Jul. 10, 2023. Note: JP 2019-091628 cited therein is already of record.
Office Action issued in corresponding Taiwanese Patent Application No. 110128721, dated Nov. 4, 2024.
Japanese Office Action issued in corresponding JP Application No. 2022-534443, dated Jul. 10, 2023. (Note: US 2019/214694 A1 and CN 105960719 A, cited therein is already of record.).
Extended European Search Report issued in corresponding European Patent Application No. 21807741.0, dated Jun. 7, 2023. Note: US 2013/0095356 cited therein is already of record.

* cited by examiner

BATTERY MODULE, BATTERY PACK COMPRISING SAME, AND AUTOMOBILE

TECHNICAL FIELD

The present disclosure relates to a battery module, a battery pack comprising the same and a vehicle, and more particularly, to a battery module with enhanced stability against fire and explosion, a battery pack comprising the same and a vehicle.

The present application claims priority to Korean Patent Application No. 10-2020-0097562 filed on Aug. 4, 2020 in the Republic of Korea, the disclosures of which are incorporated herein by reference.

BACKGROUND ART

Recently, with the rapid increase in demand for portable electronic products such as laptop computers, video cameras and mobile phones and the extensive development of electric vehicles, accumulators for energy storage, robots and satellites, many studies are being made on high performance secondary batteries that can be repeatedly recharged.

Currently, commercially available secondary batteries include nickel-cadmium batteries, nickel-hydrogen batteries, nickel-zinc batteries, lithium secondary batteries and the like, and among them, lithium secondary batteries have little or no memory effect, and thus they are gaining more attention than nickel-based secondary batteries for their advantages that recharging can be done whenever it is convenient, the self-discharge rate is very low and the energy density is high.

These lithium secondary battery mainly uses lithium-based oxide and carbon material as a positive electrode active material and a negative electrode active material, respectively. In addition, this lithium secondary battery includes an electrode assembly in which a positive electrode plate and a negative electrode plate respectively coated with the positive electrode active material and the negative electrode active material are disposed with a separator interposed therebetween, and an exterior, namely a battery case, for hermetically accommodating the electrode assembly together with an electrolyte.

In addition, depending on the shape of the exterior, lithium secondary batteries may be classified into a can-type secondary battery in which the electrode assembly is included in a metal can and a pouch-type secondary battery in which the electrode assembly is included in a pouch made of an aluminum laminate sheet.

In particular, the demand for large-capacity battery modules applied to electric vehicles and the like is increasing recently. The large-capacity battery module includes a plurality of battery cells, and thus, when a fire or explosion occurs in some of the plurality of battery cells, flames and high-temperature gas are discharged to increase the temperature of other adjacent battery cells, which may propagate fire or thermal runaway, leading to a secondary explosion. Accordingly, there is a need for a method to increase the stability against fire or gas explosion of the battery module.

DISCLOSURE

Technical Problem

The present disclosure is designed to solve the problems of the related art, and therefore the present disclosure is directed to providing a battery module with enhanced stability against fire and explosion, a battery pack comprising the same and a vehicle.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery module, comprising:

a plurality of battery cells configured to have electrode terminals respectively formed at one end and the other end thereof and have a vent unit that is opened to discharge gas to the outside when an internal pressure increases over a predetermined level;

a cell frame configured to have an accommodation space for accommodating the plurality of battery cells and have a plurality of exposure holes opened so that the gas discharged from the battery cell moves to the outside;

a screen member fixed to the cell frame to seal the exposure hole and configured to open a region thereof corresponding to the exposure hole by a gas pressure when gas is discharged from the vent unit of the battery cell; and a protection plate configured to fix the screen member and have a plurality of communication holes located corresponding to the exposure holes.

Also, the screen member may include a heat-resistant sheet provided in close contact with an outer surface of the cell frame to seal the exposure hole and configured such that a portion thereof facing the exposure hole is ruptured by the gas pressure to open the exposure hole, and the protection plate may be located at an outer side of the heat-resistant sheet so that the heat-resistant sheet is fixed to the outer surface of the cell frame.

In addition, the protection plate may include a rib protruding outward from an outer circumference of the communication hole.

Further, the protection plate may further include a perforating needle configured to perforate a part of the heat-resistant sheet when a portion of the heat-resistant sheet facing the exposure hole expands by the gas pressure.

Also, the heat-resistant sheet may include a rupture portion formed to have a relatively smaller sheet thickness than other portion.

Moreover, the screen member may further include an adhesive sheet attached to the protection plate to seal the communication hole and configured to be detached from the protection plate by an explosion pressure when the battery cell explodes.

In addition, the screen member may include a heat-resistant film coated in the exposure hole to seal the exposure hole.

Further, the battery module may further comprise a module case having an inner space configured to accommodate the cell frame, and a staying space formed between an outer wall thereof and the cell frame spaced apart from each other to temporarily accommodate gas discharged from the battery cell and configured to communicate with the communication hole.

In addition, to achieve the above-described object, a battery pack of the present disclosure includes at least one battery module.

Further, to achieve the above-described object, a vehicle of the present disclosure includes at least one battery module.

Advantageous Effects

According to an embodiment of the present disclosure, since the present disclosure includes the screen member configured to seal the exposure hole and to open the exposure hole by gas pressure and the protection plate configured to fix the screen member, the gas generated inside the cell frame may be discharged to the outside through the open exposure hole and the communication hole. Since the gas discharged to the outside of the cell frame is not able to flow into other exposure holes sealed by the screen member, it is possible to effectively prevent fire or thermal runaway from propagating to other battery cells adjacent to the battery cell where the fire or thermal runaway has occurred. Accordingly, in the present disclosure, it is possible to provide a safe battery module.

In addition, according to an embodiment of the present disclosure, since the present disclosure includes the heat-resistant sheet having the rupture portion with a relatively smaller thickness, it is possible to prevent in advance the case in which, even though gas is discharged from some battery cells, the exposure hole is not opened since the heat-resistant sheet is not ruptured. Accordingly, in the present disclosure, the exposure hole may be reliably opened, thereby preventing that the discharged gas stays inside the cell frame to increase the temperature of other adjacent battery cells and thus propagate thermal runaway. Ultimately, the safety of the battery module may be effectively improved.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
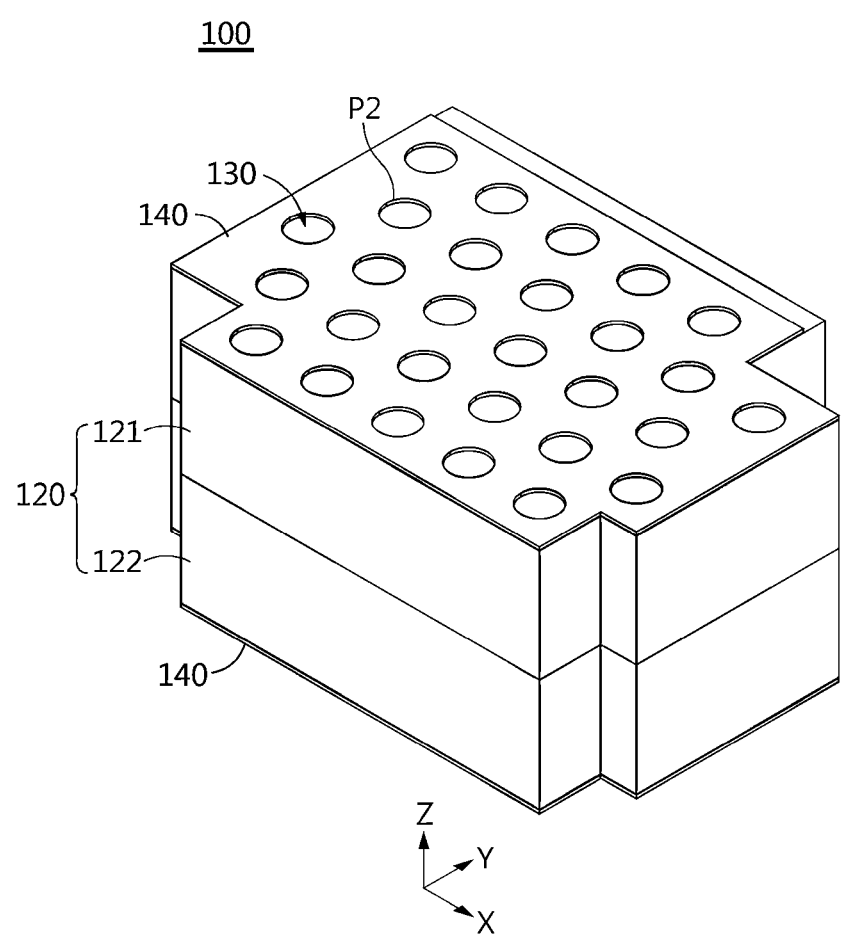
FIG. 1 is a perspective view schematically showing a battery module according to the first embodiment of the present disclosure.
Figure 2:
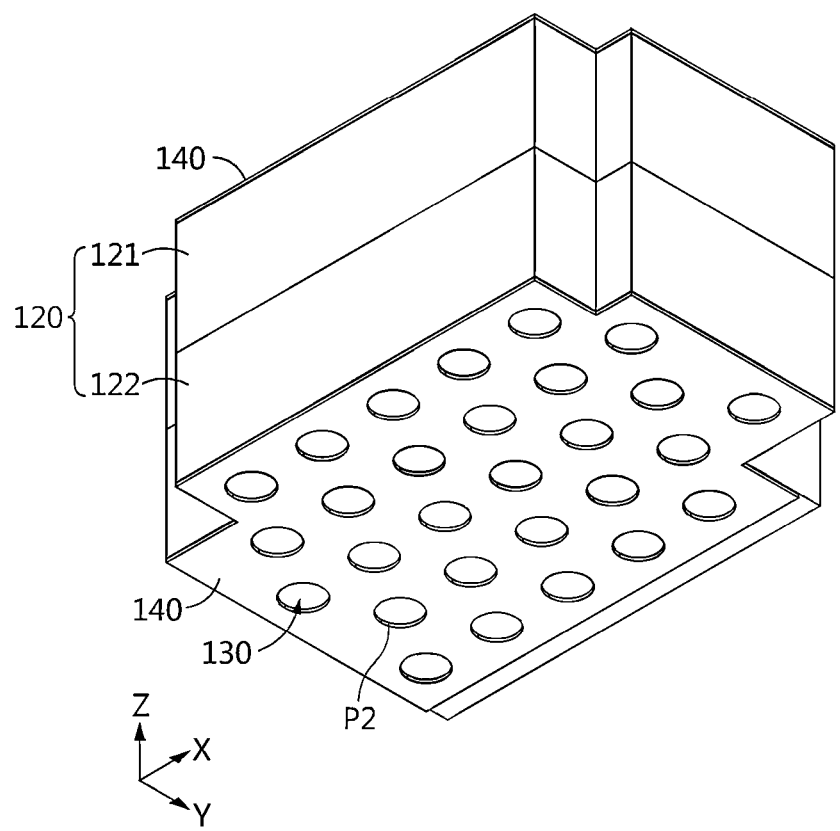
FIG. 2 is a bottom view schematically showing the battery module according to the first embodiment of the present disclosure.
Figure 3:
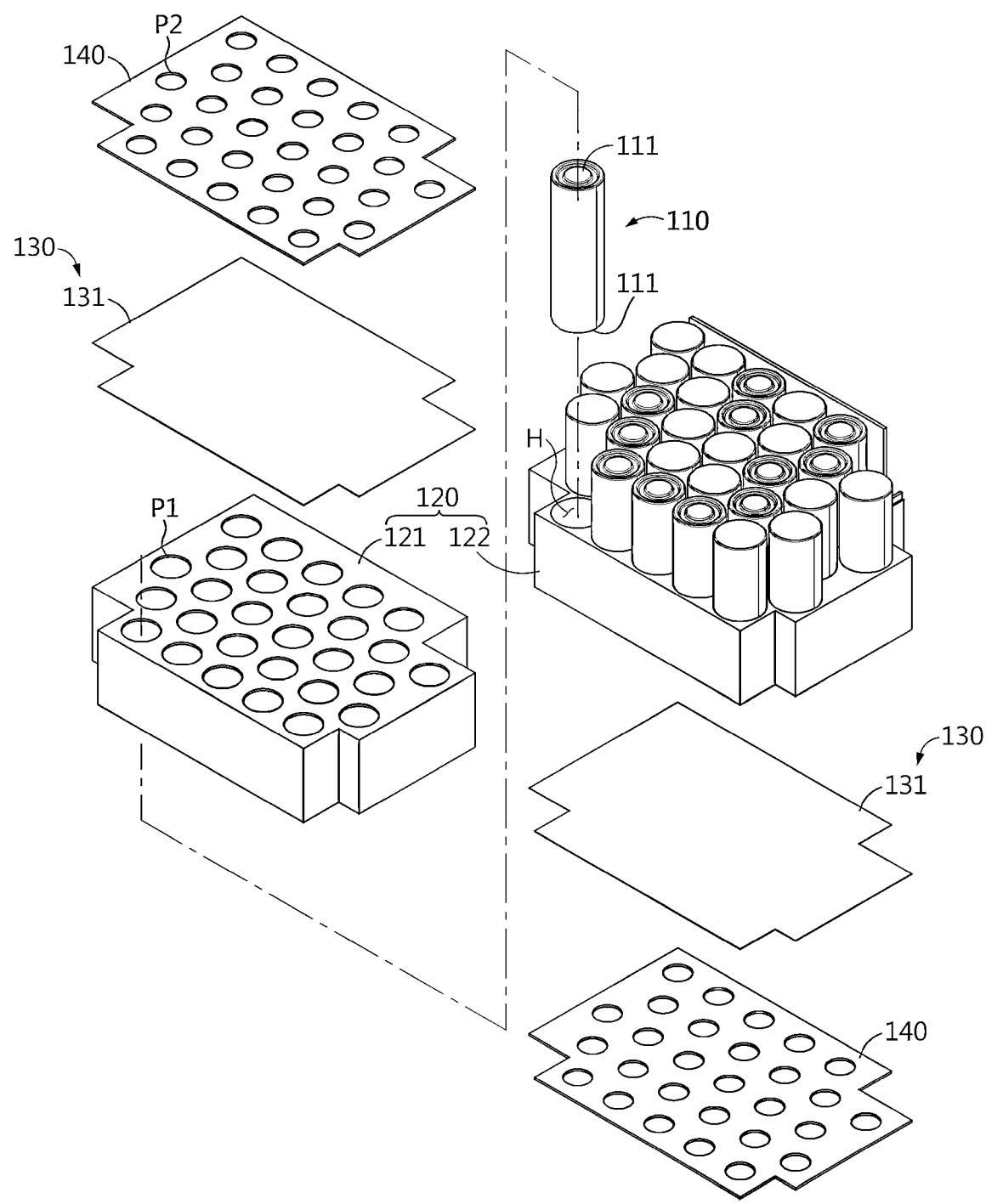
FIG. 3 is an exploded perspective view schematically showing the battery module according to the first embodiment of the present disclosure.
Figure 4:
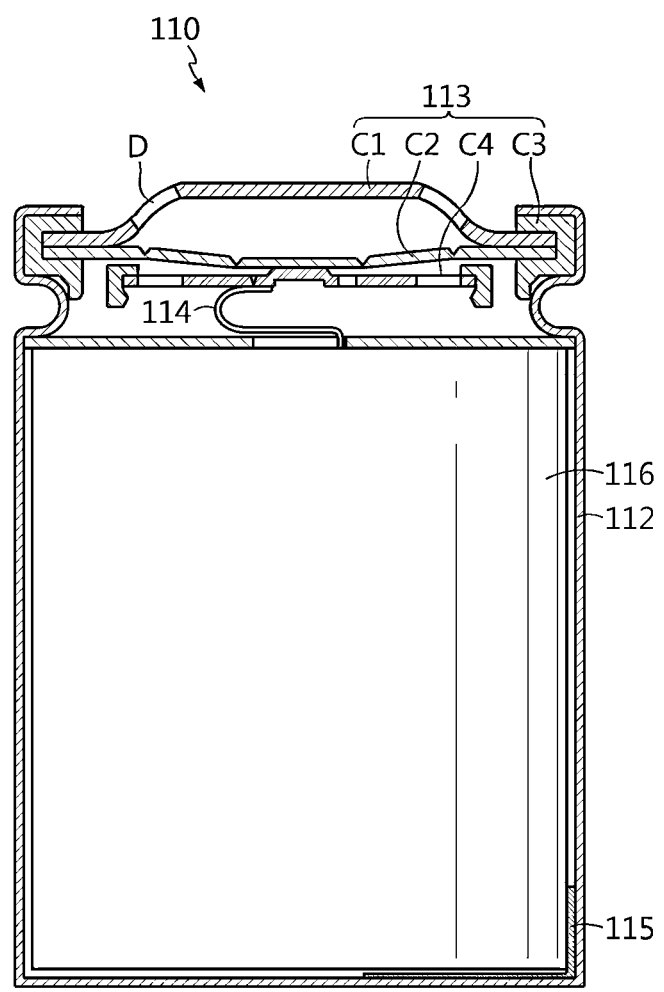
FIG. 4 is a sectional view schematically showing a battery cell of the battery module according to the first embodiment of the present disclosure.

FIG. 1 is a perspective view schematically showing a battery module according to the first embodiment of the present disclosure. FIG. 2 is a bottom view schematically showing the battery module according to the first embodiment of the present disclosure. FIG. 3 is an exploded perspective view schematically showing the battery module according to the first embodiment of the present disclosure. Also, FIG. 4 is a sectional view schematically showing a battery cell of the battery module according to the first embodiment of the present disclosure.

Referring to FIGS. 1 to 4, the battery module 100 according to the first embodiment of the present disclosure includes a plurality of battery cells 110, a cell frame 120, a screen member 130, and a protection plate 140.

Here, the battery cell 110 may include an electrode assembly 116, a battery can 112, and a cap assembly 113.

The electrode assembly 116 may have a structure in which a positive electrode plate and a negative electrode plate are wound with a separator interposed therebetween. Also, a positive electrode tab 114 may be attached to the positive electrode plate and connected to the cap assembly 113, and a negative electrode tab 115 may be attached to the negative electrode plate and connected to a lower end of the battery can 112.

The battery can 112 may have an empty space formed therein to accommodate the electrode assembly 116 therein. In particular, the battery can 112 may be configured in a cylindrical shape with an open top. Also, the battery can 112 may be made of a metal material such as steel or aluminum to secure rigidity. In addition, the negative electrode tab may attached to the lower end of the battery can 112 so that not only a lower portion of the battery can 112 but also the battery can 112 itself may function as the negative electrode terminal 111.

In addition, the battery cell 110 may have electrode terminals 111 located at one end and the other end thereof, respectively. The plurality of battery cells 110 may be electrically connected by a bus bar (not shown) having a metal material. The bus bar may be in the form of a wire or a metal plate. The plurality of battery cells 110 may be electrically connected in series, in parallel, or in series and in parallel by the bus bar. For example, although not shown, the bus bar may be accommodated in a recessed groove portion of the cell frame 120 so as not to protrude to the outside of the cell frame 120.

The cap assembly 113 may be coupled to a top opening of the battery can 112 to seal the open end of the battery can 112. The cap assembly 113 may have a circular or rectangular shape depending on the shape of the battery can 112, and may include sub-components such as a top cap C1, a vent unit C2, and a gasket C3.

Here, the top cap C1 may be located at an uppermost portion of the cap assembly 113 and configured to protrude upward. In particular, the top cap C1 may function as the positive electrode terminal 111 in the battery cell 110. Accordingly, the top cap C1 may be electrically connected to another battery cell 110 or a charging device through an external device, for example a bus bar. The top cap C1 may be formed of, for example, a metal material such as stainless steel or aluminum.

In addition, the vent unit C2 may be configured such that the shape of the vent unit C2 is deformed (ruptured) when the internal pressure of the battery cell 110, namely the internal pressure of the battery can 112, increases over a predetermined level, so that the gas inside the battery can 112 may be discharged to the outside through an opening D of the top cap C1. Here, the predetermined level of the internal pressure may be 5 to 10 atmospheres.

Moreover, the gasket C3 may be made of a material having electric insulation so that edge portions of the top cap C1 and the vent unit C2 may be insulated from the battery can 112.

Meanwhile, the cap assembly 113 may further include a current interrupt device C4. The current interrupt device C4 is also called CID. When the internal pressure of the battery increases due to gas generation so that the shape of the vent unit C2 is reversed, the contact between the vent unit C2 and the current interrupt device C4 may be cut off or the current interrupt device C4 may be damaged to block the electrical connection between the vent unit C2 and the electrode assembly 116.

The configuration of the battery cell 110 is widely known to those skilled in the art at the time of filing of this application and thus will not be described in detail here. In addition, although an example of the battery cell 110 is illustrated in FIG. 3, the battery module 100 according to the present disclosure is not limited to the configuration of the battery cell 110 having a specific shape. That is, various types of battery cells 110 known at the time of filing of this application may be employed in the battery module 100 according to the present disclosure.

In addition, the cell frame 120 may have an accommodation space for accommodating the plurality of battery cells 110 therein. The cell frame 120 may have a plurality of hollows H in a size corresponding to the battery cells 110 to accommodate the battery cells 110. For example, as shown in FIG. 3, the cell frame 120 may include a first frame 121 and a second frame 122. The plurality of hollows H may be formed in each of the first frame 121 and the second frame 122. The plurality of hollows H may have a shape extending in a vertical direction from the top to the bottom of the cell frame 120. That is, the cell frame 120 may have a plurality of exposure holes P1. The exposure hole P1 may be opened so that the gas discharged from the battery cell 110 moves to the outside. For example, as shown in FIGS. 1 and 2, the plurality of exposure holes P1 may be formed in each of an upper portion and a lower portion of the cell frame 120. The exposure hole P1 may be formed at a position corresponding to the vent unit C2 of the battery cell 110. For example, in the battery cell 110 of FIG. 4, since the vent unit C2 is located at the top end of the battery cell 110, the exposure hole P1 may be provided at the top end of the battery cell 110. More specifically, the exposure hole P1 may be provided at a position adjacent to the opening D of the top cap C1 through which the gas discharged from the vent unit C2 is discharged to the outside of the battery can 112.

Preferably, the exposure hole P1 may be formed in a size capable of covering of the opening D of the battery can 112 entirely. For example, referring to FIG. 4 as an example, the top cap C1 of the battery can 112 may have a ring-shaped opening D. In this case, the diameter of the exposure hole P1 may be configured to be greater than or equal to the diameter of the ring-shaped opening D.

The screen member 130 may be fixed to the cell frame 120 to seal the exposure hole P1. In this case, for the fixing, for example, an adhesive may be used so that the screen member 130 is attached to the outer surface of the cell frame 120. The screen member 130 may be configured such that, when gas is discharged from the vent unit C2 of the battery cell 110 to the exposure hole P1, a region thereof corresponding to the exposure hole P1 among the entire region of the screen member 130 is ruptured and opened by the gas pressure. In other words, the screen member 130 seals the exposure hole P1 at ordinary time, but when a gas explosion occurs in some battery cells 110 among the plurality of battery cells 110, the screen member 130 may be configured such that a region thereof corresponding to the exposure hole P1 facing the some battery cells 110 is converted from a sealed state to an open state by the gas explosion pressure.

In addition, the protection plate 140 may be configured to fix the screen member 130. For example, the protection plate 140 may be located in close contact with the outer surface of the screen member 130 so that the screen member 130 is fixed on the cell frame 120. That is, the screen member 130 may be interposed between the protection plate 140 and the cell frame 120. For example, after an adhesive is applied to the outer surface of the screen member 130 attached to the outer surface of the cell frame 120, the protection plate 140 may be bonded to the outer surface of the screen member 130.

Further, the protection plate 140 may have a plate shape extending in a horizontal direction. The protection plate 140 may include a plurality of communication holes P2 located corresponding to the exposure holes P1. Therefore, ultimately, the vent unit C2 of the battery cell 110, the opening D of the top cap C1, the exposure hole P1, and the communication hole P2 may all be positioned on the same line. Accordingly, the discharge path of the gas is minimized, and thus the gas may be smoothly discharged to the outside of the battery cell 110. According to this configuration of the present disclosure, since the present disclosure includes the screen member 130 configured to seal the exposure hole P1 and ruptured in a region corresponding to the exposure hole P1 by gas pressure and the protection plate 140 configured to fix the screen member 130, the gas generated inside the cell frame 120 may be discharged to the outside through the open exposure hole P1 and the communication hole P2 communicating with the exposure hole P1. Since the gas discharged to the outside of the cell frame 120 is not able to flow into other exposure holes P1 sealed by the screen member 130, it is possible to effectively prevent fire or thermal runaway from propagating to other battery cells 110 adjacent to the battery cell 110 where the fire or thermal runaway has occurred. Accordingly, in the present disclosure, it is possible to provide a safe battery module 100.

More specifically, the screen member 130 may include a heat-resistant sheet 131 having a heat-resistant material. For example, the heat-resistant material may be polycarbonate. The heat-resistant sheet 131 may be in close contact with the outer surface of the cell frame 120 to seal the exposure hole P1. The heat-resistant sheet 131 may have a predetermined thickness so that, when the battery cell 110 explodes, a portion thereof facing the exposure hole P1 is ruptured by the pressure of the gas discharged during the explosion. For example, the thickness of the heat-resistant sheet 131 may be 0.05 mm to 0.1 mm. As a portion of the heat-resistant sheet 131 is ruptured, gas may be discharged to the outside of the cell frame 120 through the exposure hole P1.

In addition, the protection plate 140 may have an electric insulating plastic material. For example, the protection plate 140 may include polyvinyl chloride. The protection plate 140 may be located at an outer side of the heat-resistant sheet 131 so that the heat-resistant sheet 131 is fixed to the outer surface of the cell frame 120. For example, as shown in FIGS. 1 and 2, the battery module 100 of the present disclosure may include the screen member 130 and the protection plate 140 at the upper portion and the lower portion of the cell frame 120, respectively. At this time, the protection plate 140 may be fixed to the outer surface of the heat-resistant sheet 131 so that, except for a portion of the heat-resistant sheet 131 facing the exposure hole P1, the remaining portion of the heat-resistant sheet 131 comes into close contact with the outer surface of the cell frame 120.

Therefore, according to this configuration of the present disclosure, since the present disclosure includes the heat-resistant sheet 131 and the protection plate 140 for fixing the heat-resistant sheet 131, a region of the heat-resistant sheet 131 corresponding to the exposure hole P1 may be opened by the gas discharged from some battery cells 110 to effectively discharge the gas to the outside of the cell frame 120, and the battery cells 110 are not easily damaged by the flame, thereby safely protecting other battery cells 110 where thermal runaway or fire does not occur. That is, in the present disclosure, the sealed state of the exposure holes P1 of the cell frame 120 facing the remaining battery cells 110 may be continuously maintained, except for the battery cells 110 where the explosion has occurred, thereby effectively preventing secondary explosion, fire or thermal runaway from propagating.

Figure 5:
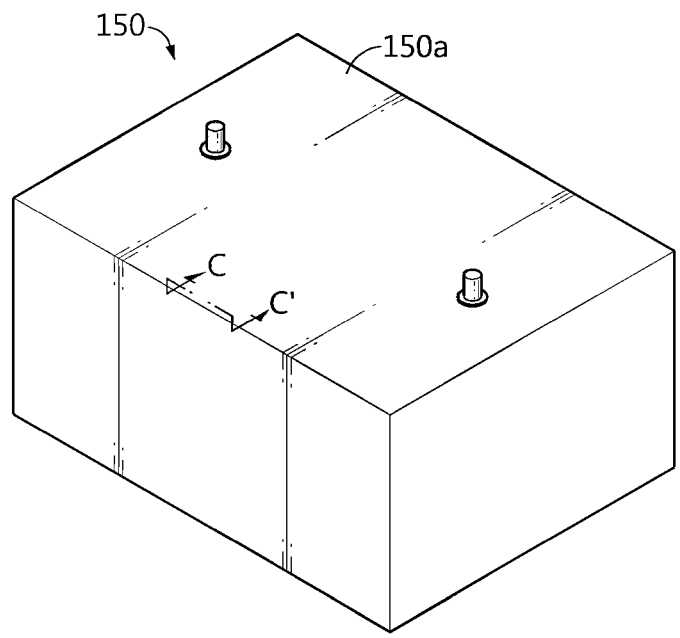
FIG. 5 is a perspective view schematically showing some components of a battery module according to the second embodiment of the present disclosure.

FIG. 5 is a perspective view schematically showing some components of a battery module according to the second embodiment of the present disclosure. Also, FIG. 6 is a partially sectioned view schematically showing a part of the battery module, taken along the line C-C' of FIG. 5.

Figure 6:
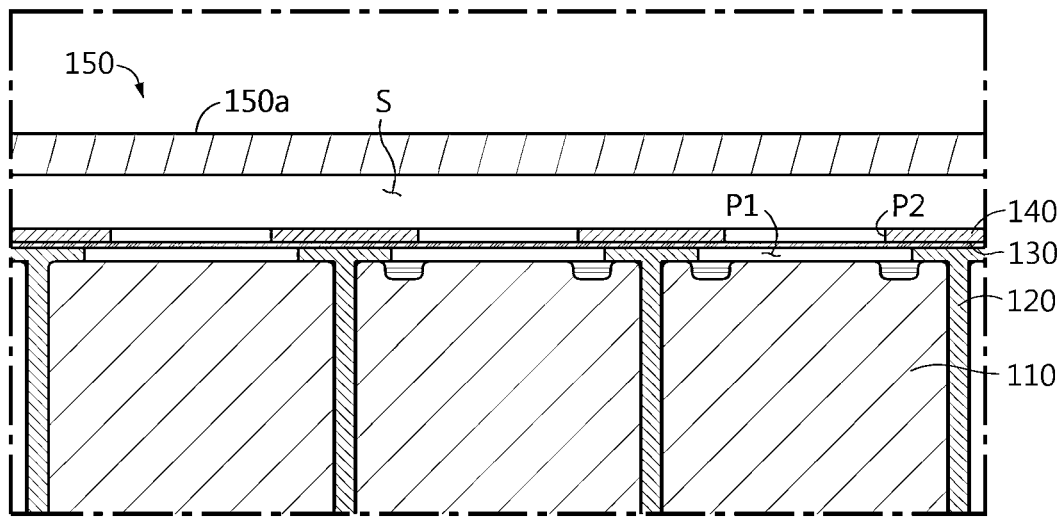
FIG. 6 is a partially sectioned view schematically showing a part of the battery module, taken along the line C-C' of FIG. 5.

Referring to FIGS. 5 and 6 along with FIG. 3, the battery module 100 according to the second embodiment of the present disclosure may further include a module case 150. The module case 150 may have an inner space configured to accommodate the cell frame 120 therein. That is, the module case 150 may include an outer wall 150a of a rectangular box shape with an empty interior.

In addition, the module case 150 may have a staying space S formed between an outer wall 150a thereof and the cell frame 120 spaced apart from each other. The staying space S may communicate with the communication hole P2. The staying space S may be configured to temporarily accommodate the gas discharged from the battery cell 110.

Therefore, according to this configuration of the present disclosure, the present disclosure is configured such that the high-temperature gas discharged by the explosion of the battery cell 110 temporarily stays in the staying space S, and it is possible to prevent the gas from flowing again into the cell frame 120 through other exposure holes P1 by means of the heat-resistant sheet 131 interposed between the cell frame 120 and the protection plate 140. Accordingly, the discharged gas is not discharged to the outside of the module case 150, thereby preventing damage to a person or other devices located near the battery module 100.

Figure 7:
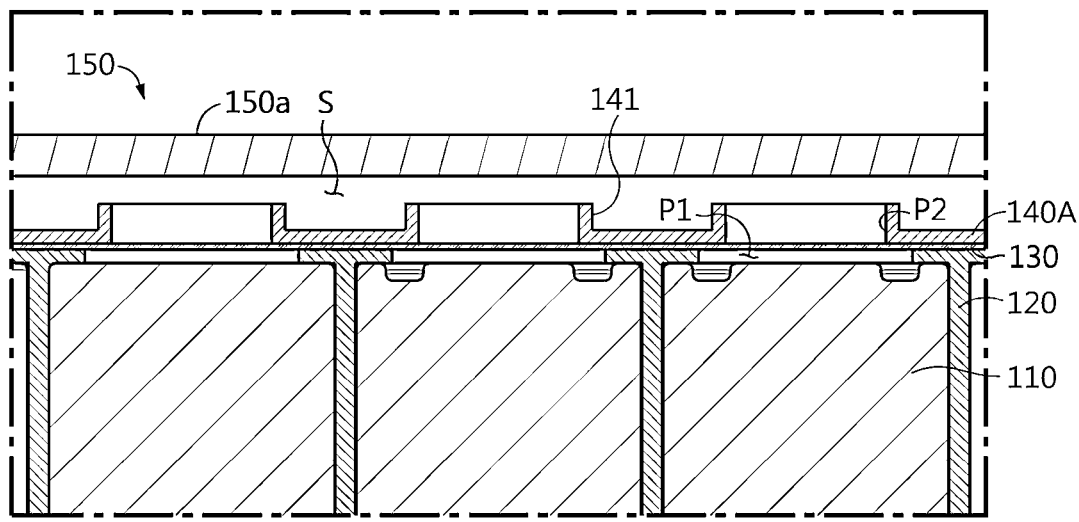
FIG. 7 is a partially sectioned view schematically showing a part of a battery module according to the third embodiment of the present disclosure.

FIG. 7 is a partially sectioned view schematically showing a part of a battery module according to the third embodiment of the present disclosure.

Referring to FIG. 7 along with FIG. 5, the battery module according to the third embodiment of the present disclosure is different from the battery module 100 according to the first embodiment of FIG. 6, in that the protection plate 140A further includes a rib 141. However, other components of the battery module according to the third embodiment of FIG. 7 are the same as those of the battery module 100 of the first embodiment of FIG. 1 and thus will not be described again.

The protection plate 140A of the battery module 100 according to the third embodiment of the present disclosure may include a rib 141 protruding from an outer circumference of the communication hole P2 in the outward direction (toward the outer wall 150a of the module case 150). The rib 141 may have a tubular shape communicating with the communication hole P2. For example, as shown in FIG. 7, the protection plate 140A fixed to the heat-resistant sheet 131 may include a rib 141 protruding upward from the outer circumference of the communication hole P2.

Therefore, according to this configuration of the present disclosure, since the present disclosure further includes the rib 141 on the protection plate 140A, it is possible to prevent the gas discharged from some battery cells 110 among the plurality of battery cells 110 from directly flowing into the cell frame 120 through another communication hole P2 directly adjacent thereto. Accordingly, in the present disclosure, it is possible to safely protect the remaining battery cells 110 where thermal runaway or fire does not occur.

Figure 8:
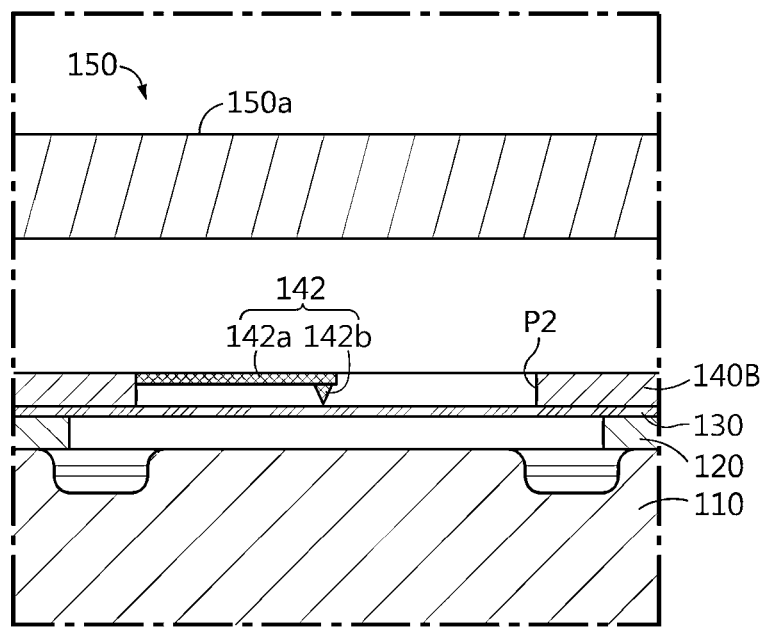
FIG. 8 is a partially sectioned view schematically showing a part of a battery module according to the fourth embodiment of the present disclosure.

FIG. 8 is a partially sectioned view schematically showing a part of a battery module according to the fourth embodiment of the present disclosure.

Referring to FIG. 8 along with FIG. 5, the battery module according to the fourth embodiment of the present disclosure is different from the battery module 100 according to the first embodiment of FIG. 6, in that a perforating needle 142 is further provided to the protection plate 140B, and other components may be the same.

The perforating needle 142 may be provided in the communication hole P2 of the protection plate 140B. The perforating needle 142 may include an extending portion 142a extending from an inner surface of the communication hole P2 to a central position of the communication hole P2, and a needle portion 142b provided at an end of the extending portion 142a. When a portion of the heat-resistant sheet 131 facing the exposure hole is expands outward (toward the perforating needle) by the gas pressure, the perforating needle 142 may be configured to come into contact with a part of the heat-resistant sheet 131 to perforate a part of the heat-resistant sheet 131. The needle portion 142b may have a shape sharply protruding toward the heat-resistant sheet 131 from the end of the extending portion 142a.

Therefore, according to this configuration of the present disclosure, since the present disclosure includes the perforating needle 142 configured to perforate a part of the heat-resistant sheet 131, it is possible to prevent in advance the case in which, even though gas is discharged from some battery cells 110, the exposure hole P1 is not opened since the heat-resistant sheet 131 is not ruptured. Accordingly, in the present disclosure, the exposure hole P1 may be reliably opened, thereby preventing that the discharged gas stays inside the cell frame 120 to increase the temperature of other adjacent battery cells 110 and thus propagate thermal runaway. Ultimately, the safety of the battery module 100 may be effectively improved.

Figure 9:
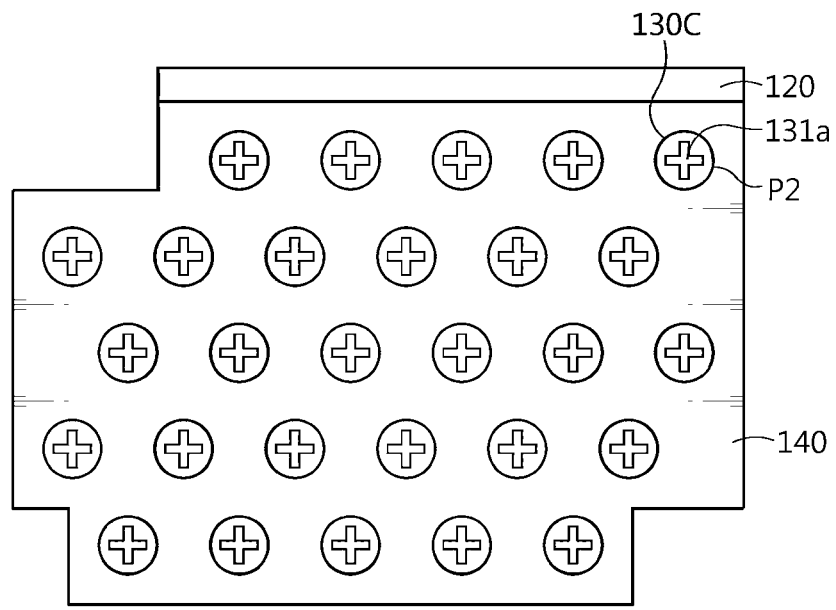
FIG. 9 is a plan view schematically showing a battery module according to the fifth embodiment of the present disclosure.

FIG. 9 is a plan view schematically showing a battery module according to the fifth embodiment of the present disclosure.

Referring to FIG. 9 along with FIG. 3, the battery module according to the fifth embodiment of the present disclosure is different from the battery module 100 according to the first embodiment, in that the heat-resistant sheet 131 of the screen member 130C further includes a rupture portion 131*a*. Other components are the same as those of the battery module 100 according to the first embodiment and thus will not be described again.

The heat-resistant sheet 131 of the battery module 100 according to the fifth embodiment of the present disclosure may include a rupture portion 131*a* configured to have a smaller thickness than the remaining portion of the sheet. For example, the rupture portion 131*a* may have a linear shape. For example, as shown in FIG. 9, the rupture portion 131*a* may have a cross shape in a plan view. The rupture portion 131*a* may be formed in a portion of the heat-resistant sheet 131 facing the exposure hole P1.

Therefore, according to this configuration of the present disclosure, since the present disclosure includes the heat-resistant sheet 131 having the rupture portion 131*a* with a relatively smaller thickness, it is possible to prevent in advance the case in which, even though gas is discharged from some battery cells 110, the exposure hole P1 is not opened since the heat-resistant sheet 131 is not ruptured. Accordingly, in the present disclosure, the exposure hole P1 may be reliably opened, thereby preventing that the discharged gas stays inside the cell frame 120 to increase the temperature of other adjacent battery cells 110 and thus propagate thermal runaway. Ultimately, the safety of the battery module 100 may be effectively improved.

Figure 10:
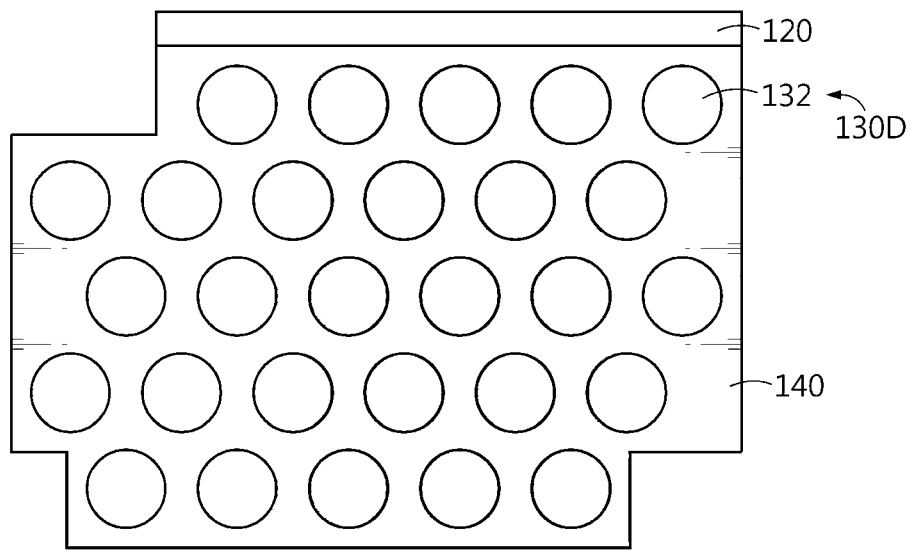
FIG. 10 is a plan view schematically showing a battery module according to the sixth embodiment of the present disclosure.

FIG. 10 is a plan view schematically showing a battery module according to the sixth embodiment of the present disclosure.

Referring to FIG. 10 along with FIG. 3, the battery module according to the sixth embodiment of the present disclosure is different from the battery module 100 according to the first embodiment, in that the screen member 130D may further include an adhesive sheet 132. The adhesive sheet 132 may be provided at an outer side of the heat-resistant sheet 131. That is, the adhesive sheet 132 may be located between the heat-resistant sheet 131 and the protection plate 140 and/or between the heat-resistant sheet 131 and the cell frame 120. Other components are the same as those of the battery module 100 according to the first embodiment and thus will not be described again.

The adhesive sheet 132 may be attached to the protection plate 140 to seal the communication hole P2. The adhesive sheet 132 may be attached to the outer circumference of the communication hole P2 by the adhesive applied to the adhesive sheet 132. That is, the adhesive sheet 132 may be located to cover the communication hole P2.

In addition, the adhesive sheet 132 may be configured to be detached from the protection plate 140 by explosion pressure when the battery cell 110 explodes. That is, the adhesive sheet 132 may be pushed out and separated from the protection plate 140 by the pressure of the gas introduced into the exposure hole P1.

Therefore, according to this configuration in the present disclosure, since the present disclosure includes the adhesive sheet 132, the adhesive sheet 132 may seal the communication hole P2 at ordinary time, and when it is required to discharge gas since some battery cells 110 of the plurality of battery cells 110 explode, the adhesive sheet 132 may open the communication hole P2. Accordingly, in the present disclosure, even if gas explosion occurs in some battery cells 110, the heat-resistant sheet 131 for sealing the exposure hole P1 and the adhesive sheet 132 for sealing the communication hole P2 perform double sealing, thereby reliably preventing the gas from flowing into other adjacent battery cells 110. Ultimately, the safety of the battery module 100 may be improved.

Figure 11:
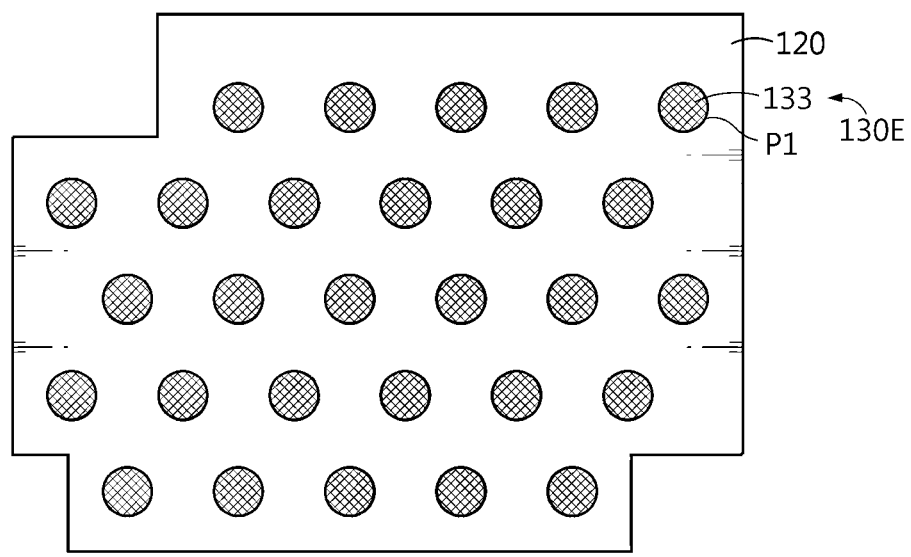
FIG. 11 is a plan view schematically showing a battery module according to the seventh embodiment of the present disclosure.

FIG. 11 is a plan view schematically showing a battery module according to the seventh embodiment of the present disclosure.

Referring to FIG. 11 along with FIG. 3, the battery module according to the seventh embodiment of the present disclosure is different from the battery module 100 according to the first embodiment, in that the screen member 130E may have a different configuration. That is, the screen member 130E of the battery module according to the seventh embodiment may include a heat-resistant film 133 instead of the heat-resistant sheet 131. However, since other components are the same as those of the battery module 100 according to the first embodiment and thus will not be described again.

The heat-resistant film 133 may be coated in the exposure hole P1 to seal the exposure hole P1. That is, the heat-resistant film 133 may be formed by filling the inside of the exposure hole P1 with a resin having heat resistance and then curing the resin. The heat-resistant film 133 may include, for example, polycarbonate. For example, as shown in FIG. 11, the heat-resistant film 133 may be provided in each of the plurality of exposure holes P1. In some cases, the heat-resistant film 133 may be partially interposed and fixed between the outer wall of the cell frame 120 and the protection plate 140.

Therefore, according to this configuration of the present disclosure, since the present disclosure includes the heat-resistant film 133, when compared with the heat-resistant sheet 131 of the battery module 100 of the first embodiment, the amount of the screen member 130E may be minimized, thereby reducing material costs.

Meanwhile, a battery pack according to an embodiment of the present disclosure may include at least one battery module 100 and a BMS electrically connected to the battery module 100. The BMS may include various types of circuits or devices to control the charge/discharge of the plurality of battery cells.

Meanwhile, a vehicle (not shown) according to an embodiment of the present disclosure may include at least one battery module 100 and a vehicle body having a receiving space in which the battery module 100 is received. For example, the vehicle may be an electric vehicle, an electric scooter, an electric wheelchair or an electric bike.

Meanwhile, the terms indicating directions as used herein such as upper, lower, left, right, front and rear are used for convenience of description only, and it is obvious to those skilled in the art that the term may change depending on the position of the stated element or an observer.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. A battery module, comprising:
a plurality of battery cells having electrode terminals at respective ends of each of the plurality of battery cells and having a vent unit opened to discharge gas when an internal pressure increases over a predetermined level;
a cell frame having an accommodation space for accommodating the plurality of battery cells, the cell frame having a plurality of exposure holes opened through the cell frame so that the gas discharged from the battery cell moves to an outside of the cell frame;
a screen member fixed in direct contact with an outer surface of the cell frame to seal the exposure holes and configured to open regions thereof respectively corresponding to the exposure holes by a gas pressure when gas is discharged from the vent unit of the battery cell; and
a protection plate configured to fix the screen member to the cell frame, the protection plate being in direct contact with an outer surface of the screen member and having a plurality of communication holes located corresponding to the exposure holes.

2. The battery module according to claim 1,
wherein the screen member further includes an adhesive sheet attached to the protection plate to seal the communication hole and configured to be detached from the protection plate by an explosion pressure when the battery cell explodes.

3. The battery module according to claim 1,
wherein the screen member includes a heat-resistant film coated in the exposure hole to seal the exposure hole.

4. The battery module according to claim 1, further comprising:
a module case having an inner space configured to accommodate the cell frame, and a staying space between an outer wall thereof and the cell frame spaced apart from each other to temporarily accommodate gas discharged from the battery cell and configured to communicate with the communication hole.

5. The battery module according to claim 1, wherein the screen member covers an entire upper surface of the cell frame.

6. The battery module according to claim 1,
wherein the screen member includes a heat-resistant sheet in direct contact with an outer surface of the cell frame to seal the exposure hole such that a portion thereof facing the exposure hole is ruptured by the gas pressure to open the exposure hole, and
wherein the protection plate is located at an outer side of the heat-resistant sheet so that the heat-resistant sheet is fixed to the outer surface of the cell frame.

7. The battery module according to claim 6,
wherein the protection plate includes a rib protruding outward from an outer circumference of the communication hole.

8. The battery module according to claim 6,
wherein the protection plate further includes a perforating needle configured to perforate a part of the heat-resistant sheet when a portion of the heat-resistant sheet facing the exposure hole expands by the gas pressure.

9. The battery module according to claim 6,
wherein the heat-resistant sheet includes a rupture portion having a relatively smaller sheet thickness than other portions of the heat-resistant sheet.

10. The battery module according to claim 6, wherein the screen member further includes an adhesive sheet attached to the protection plate to seal the communication hole and configured to be detached from the protection plate by an explosion pressure of a battery cell explosion.

11. A battery pack, comprising at least one battery module according to claim 1.

12. A vehicle, comprising at least one battery module according to claim 1.

* * * * *